(12) United States Patent
Siepierski et al.

(10) Patent No.: US 6,268,074 B1
(45) Date of Patent: Jul. 31, 2001

(54) WATER INJECTED FUEL CELL SYSTEM COMPRESSOR

(75) Inventors: James S. Siepierski, Williamsville; Barbara S. Moore, Victor; Martin Monroe Hoch, Webster, all of NY (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/286,311

(22) Filed: Apr. 5, 1999

(51) Int. Cl.$^7$ .................................................. H01M 8/04
(52) U.S. Cl. .................................. 429/13; 429/22; 429/34
(58) Field of Search ................................ 429/13, 22, 30, 429/34

(56) References Cited

U.S. PATENT DOCUMENTS

| | | | |
|---|---|---|---|
| 4,362,789 | 12/1992 | Dighe | 429/17 |
| 4,627,795 | * 12/1986 | Schmitz-Montz | 417/267 |
| 4,758,138 | * 7/1988 | Timuska | 418/100 |
| 4,759,997 | 7/1988 | Ohyauchi et al. | 429/19 |
| 4,859,545 | 8/1989 | Scheffler et al. | 429/17 |
| 5,432,020 | 7/1995 | Fleck | 429/13 |
| 5,543,238 | 8/1996 | Strasser | 429/17 |
| 5,645,950 | 7/1997 | Benz et al. | 429/13 |
| 5,780,981 | 7/1998 | Sonntag et al. | 318/139 |
| 5,935,726 | * 8/1999 | Chow et al. | 429/13 |
| 5,976,722 | * 11/1999 | Müller et al. | 429/13 |

OTHER PUBLICATIONS

"Screw Compressor Technology Pro Environment" GVM Gesellschaft product brochure, pre–1995, 6 pages. (month unknown).

"Research and Development of a Proton Exchange Membrane (PEM) Fuel Cell System for Transportation Applications", Progress Report for Quarter 9 of the Phase II Effect, Apr. 1, 1997, pp 23–25.

"Research of Oil–Injected Scroll Compressor Working Process", Li Huiqing, et al. Jul. 14, 1992, pp 118b1–118b14.

"A Compact Horizontal Scroll–Type Compressor For Room Air Conditioners", Sawai, Kiyoski, et al. Jul. 14, 1992, pp 569–576.

"Liquid Refrigerant Injection in Scroll Compressors Operating at High Compression Ratios" Ayub, Shawket, et al. Jul. 14, 1992, pp 561–568.

"Gas Turbine Combustion" Arthur H. Lefebvre, 1983, pp179–185. (month N.A.).

The Gas Turbine Engine, Jan P. Norbye, 1975, pp306–308. (month N.A.).

"Gas Turbine Analysis and Practice", Burgess H. Jennings, Willard L. Rogers, 1953, pp 249–250. (month N.A.).

"Gas Turbines For Aircraft", Ivan H. Driggs, Otis E. Lancaster,1955, p. 222. (month N.A.).

"Jet Aircarft Power Systems" Principles and Maintenance, Jack V. Casamassa, 1950 pp 138–141. (month N.A.).

"The Intercooler With Spraying Water For Air Compressors", Kang Yong, Aug. 4, 1986, p153–158.

"Experiment on Wwter Spraying Internal Cooling Within the Compressor of Gas Turbine" Zheng Oun, et al. Harbin Engineering University, 1977 pp1–7 (month unknown).

"Liquid Ring Vacuum Pumps and Compressors" Faragallah, W. Hakij, pp 1–7. (1985, month unknown).

* cited by examiner

Primary Examiner—Stephen Kalafut
(74) Attorney, Agent, or Firm—Lawrence B. Plant

(57) ABSTRACT

A fuel cell system including a dry compressor for pressurizing air supplied to the cathode side of the fuel cell. An injector sprays a controlled amount of water on to the compressor's rotor(s) to improve the energy efficiency of the compressor. The amount of water sprayed out the rotor(s) is controlled relative to the mass flow rate of air inputted to the compressor.

9 Claims, 1 Drawing Sheet

WATER INJECTED FUEL CELL SYSTEM COMPRESSOR

The Government of the United States of America has rights in this invention pursuant to Contract No. DE-AC02-90CH10435 awarded by the U.S. Department of Energy.

TECHNICAL FIELD

This invention relates to fuel cell systems using compressed air as the oxidant, and more particularly an energy efficient compressor and method for compressing the air.

BACKGROUND OF THE INVENTION

A fuel cell is an electrochemical device that continuously produces electrical energy from a fuel (e.g. hydrogen) and an oxidant (e.g. $O_2$) supplied continuously from external sources. One such $H_2$—$O_2$ fuel cell, for example, is the so-called proton exchange membrane (PEM) fuel cell which uses an ion exchange membrane as the electrolyte. Hydrogen for the anode of such fuel cells may be provided from hydrogen storage tanks, or generated from dissociated methanol, gasoline, hydrazine or the like while air is used as the oxidant on the cathode side of the cell.

In addition to the fuel cell itself, fuel cell systems require a variety of auxiliary equipment (e.g. pumps, heat exchangers, fuel processors, combustors, water separators, etc.) to support the operation of the fuel cell. One such piece of auxiliary equipment is an air compressor for supplying compressed air to the cathode side of the cell, and to other of the auxiliary equipment, as needed. Fuel cell system compressors may be of the so-called "dynamic" type such as centrifugal or turbine compressors that have rapidly rotating rotor(s) that increase the velocity and pressure of the gas moving therethrough. The fuel cell compressor may also be of the so-called "positive displacement" type that has one or more rotor(s) in close proximity to each other, or to a stator. Positive displacement compressors are well known in the art and include rotary machines such as scroll machines, vane machines and screw machines, roots blowers, among others, and are generally characterized by an arrangement of members connected and constructed so that they (1) define and fill a cavity which is formed at the inlet port, (2) trap gas in the cavity, (3) transport the gas in the cavity toward a discharge port, with or without compression enroute, and (4) expel the gas from the cavity to the outlet port by mechanical displacement.

Positive-displacement air compressors can take many forms, but generally fall into two main classes, i.e. "wet" and "dry". "Wet" compressors, by design, have rotor(s) that engage each other, or a stator, across a film of lubricant (e.g. oil, water etc.) that is typically provided from a reservoir within the compressor. The lubricant prevents wear of the rotor(s)/stator and provides a liquid seal where the rotor(s) confront each other or a stator. The liquid seal retards backflow of the compressed gas into the compressor (i.e. reduces internal leakage). "Dry" compressors, on the other hand, by design, have rotor(s) which is/are closely spaced from each other, or from a stator, and have no sealing lubricant film therebetween. Rather, there is only a close clearance between the relatively moving parts, which clearance is typically maintained by timing gears or the like.

At low gas flow rates, wet compressors are generally more efficient than dry compressors, because of the moving liquid seal and the cooling effects provided by the lubricant. However, running a "wet" compressor dry (i.e. without the lubricant) would destroy it. Dry compressors, on the other hand, can run without lubricating the rotor(s), and are generally preferred for automobile-type fuel cell systems because they (1) require less input energy at their optimum design point than a wet compressor having the same capacity, (2) don't contaminate the oxidant gas, and (3) are not susceptible to freezing in cold weather applications. Moreover, dry compressors are suitable for high temperature operations, and for quick warm-up of a fuel cell system that has been allowed to stand idle and cool down. However, dry compressors work efficiently only at high gas flow rates, and high rotor speeds, which minimize internal leakage through the clearance spaces between the co-acting relatively moving parts (i.e. rotors and stators). At low gas flow rates (e.g. when the electrical demands on the fuel cell are low), dry compressors are quite inefficient because internal leakage becomes an increasingly larger percentage of the total flow through the compressor. An inefficient compressor, in turn, demands more fuel cell energy than an efficient compressor. In this regard, fuel cell system compressors are driven by electric motors that are energized by electric current withdrawn from the fuel cell. As such, the compressor drive motors are parasitic loads on the fuel cell system, in that the electrical current that they require must be subtracted from the current produced by the fuel cell which would otherwise be available to produce useful work (e.g. propel an automobile). Hence, the more inefficient the compressor, the greater the parasitic load that is placed on the fuel cell.

SUMMARY OF THE INVENTION

The present invention contemplates a fuel cell system employing a dry compressor to provide compressed air to the fuel cell, (and other system equipment, as may be needed), wherein the energy efficiency of the dry compressor is optimized, particularly at low compressor speeds, in order to reduce the parasitic load the compressor places on the fuel cell system. More specifically, the invention contemplates spraying controlled amounts of water directly onto the rotor(s) of the dry compressor to reduce the energy required by the compressor to compress a given amount of air. In this regard, the spray forms a thin film of water on the rotor(s) that quickly evaporates which, in turn, cools and densifies the air as it is being compressed and thereby reduces the amount of work required for compression. Moreover, in positive-displacement dry compressors, the water also forms a liquid seal in the compression zone between the relatively moving parts and/or stator that serves to reduce internal leakage within the compressor, and further improve compressor efficiency, especially at low compressor speeds.

According to one aspect of the invention, the fuel cell system comprises a fuel cell having a cathode inlet for admitting compressed air into the cathode side of the fuel cell, and a cathode outlet for exhausting water-containing cathode effluent from the fuel cell. The system includes a water collector downstream of the cathode outlet to collect water extracted (e.g. condensed) from the cathode effluent. A pump removes water from the water collector and directs it into a water injector connected to a dry compressor that provides the compressed air to the cathode inlet of the fuel cell over a range of operating pressures (e.g. about 5 psig to about 30 psig) suitable to the fuel cell. The compressor has one or more rotors that co-act either with each other, or with a stator, to compress the air passing therethrough. The injector is positioned in the compressor so that it can spray a mist of atomized water directly onto the compressor's rotor(s) where it serves to: (1) form an efficiency-enhancing liquid seal between relatively moving parts in positive displacement compressors; (2) cool/densify the air passing through the compressor; and (3) humidify the air. A mass flow meter measures the mass flow rate of the input air to the compressor. A controller communicates with the mass air flow meter and the injector, and is programmed to modulate the flow of water through the injector as a function of the mass flow rate of the input air into the compressor so as to optimize the energy efficiency of the compressor at a particular mass air flow rate.

According to one preferred embodiment of the invention, the fuel cell system also includes a valved conduit that communicates the compressor exhaust conduit (i.e. leading to the fuel cell and other auxiliary equipment) to the injector's water supply conduit (i.e. from the water pump) for purging water from the injector and its supply conduit using compressor output air when the fuel cell system is shut down and the compressor running on auxiliary power (e.g. a battery). Opening and closing of the purging line valve may be carried out manually, but will preferably be done automatically by the controller.

The water injector preferably comprises a continuous, or intermittent-duty, automotive-type injector commonly used to spray fuel (e.g. gasoline) into the intake of an internal combustion engine. Most preferably, the injector comprises a pulse-width type, intermittent flow injector that intermittently injects the water in spurts of varying duration and frequency so as to vary the overall flow rate of the water, without varying the spray pattern from the injector.

Most preferably, the fuel cell system includes: (1) a fuel processor for converting a hydrocarbon fuel (e.g. gasoline, methanol etc.) to hydrogen; (2) a combustor fueled by $H_2$-rich anode effluent and $O_2$-containing cathode effluent for heating the fuel processor; and (3) the water collector is located downstream from the combustor or fuel processor.

According to another aspect of the present invention, there is provided a method of operating a fuel cell system that includes: (a) inputting air to a dry compressor that provides compressed air to the cathode side of a fuel cell at operating pressures suitable to the fuel cell, which compressor has at least one rotor for effecting the compressing; (b) generating water in the fuel cell and exhausting water-containing cathode effluent from the cathode side of the fuel cell; (c) collecting the water from the cathode effluent in a water collector located downstream of the fuel cell; (d) spraying water from the water collector onto the rotor(s) of the compressor so as to increase the compressor's energy efficiency over a range of operating speeds; (e) measuring the mass flow rate of the air inputted to the compressor; and (f) modulating the amount of water sprayed onto the rotor(s) in relation to the mass flow rate of the air inputted to the compressor to minimize the energy consumed by the compressor's drive motor at a particular mass air flow rate.

BRIEF DESCRIPTION OF THE DRAWINGS

The invention will be better understood when considered in the light of the following detailed description of a specific, preferred embodiment thereof which is provided hereafter in conjunction with the several drawings in which.

DESCRIPTION OF THE PREFERRED EMBODIMENT

Figure 1:
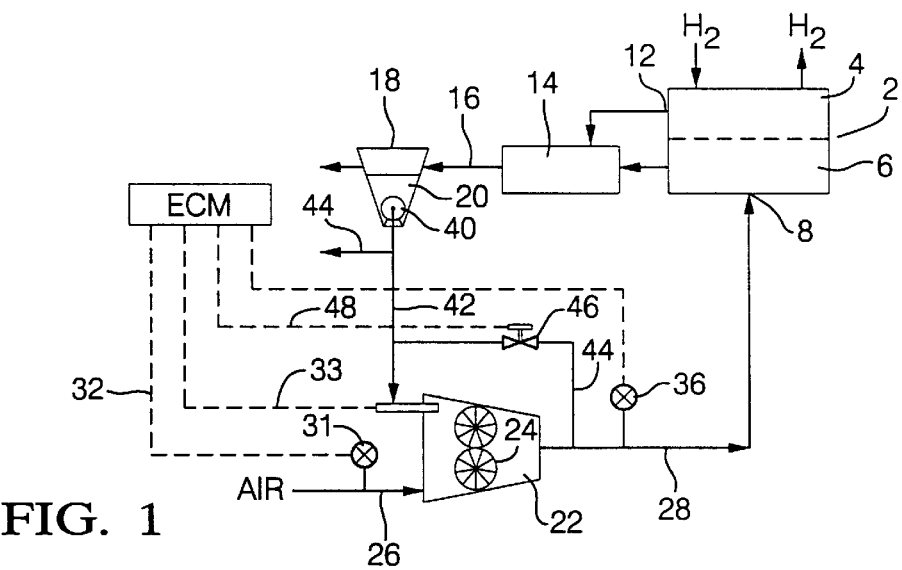
FIG. 1 is a schematic of a simplified fuel cell system in accordance with the present invention.

FIG. 1 schematically illustrates a simplified fuel cell system (i.e. sans a fuel processor and other auxiliary equipment) having a PEM, $H_2$—$O_2$ fuel cell 2 including an anode side 4 for receiving hydrogen fuel, and a cathode side 6 for receiving air from an air inlet 8. The fuel cell 2 electrochemically reacts the hydrogen and oxygen in the air to produce electricity at the fuel cell's electrical terminals, and water in the cathode side 6 of the fuel cells. Cathode effluent (i.e. water and unreacted air) exit the cathode side 6 of the fuel cell 2 via cathode outlet 10, while anode effluent (i.e. unreacted hydrogen) exits the anode side 4 of the fuel cell 2 via anode outlet 12. The anode and cathode effluents enter a combustor 14 where they are burned to form water and produce hot combustion gases 16 that are used to heat a $H_2$-producing fuel processor (not shown) that converts gasoline, methanol, or the like into $H_2$ for use in the fuel cell. One such fuel processor is a steam reformer well known in the art. The water-containing combustion gases 16 pass through a water collector 18 that extracts the water from the gases 16 and stores it in a reservoir 20 for subsequent use elsewhere in the fuel cell system. In a system having a fuel processor, the water collector 18 will preferably be located downstream of the fuel processor (i.e. after the combustion gases have been water-enriched by the combustor reaction and give up some of their heat to the fuel processor), but may be located directly after the combustor (as shown). On the other hand in systems using tanked hydrogen (i.e. no fuel processor), the collector 18 can be located directly after the fuel cells, if so desired.

The fuel cell system includes a dry compressor 22 having at least one rotating rotor 24 (two are illustrated) for compressing input air 26 to a pressure suitable (e.g. about 5 psig to about 30 psig) for supply to the fuel cell cathode inlet 8 via conduit 28. The dry compressor 22 is preferably a positive-displacement type compressor in order to obtain the maximum benefits of the present invention. A particular positive displacement type compressor seen useful for low pressure fuel cell operations (i.e., less than about 10 psig) is a so-called "roots blower" of the type that is used to supercharge internal combustion engines. One such supercharger/blower is sold by the Eaton Corporation of Cleveland, Ohio for use in vehicles manufactured by the assignee of the present invention. Using a set of intermeshing rotors, the roots blowers trap pockets of air therebetween and the stator, and move the pockets from the inlet to the outlet of the machine with no internal compression while the gas is enroute. Alternatively, the compressor 22 may be a "dynamic" type compressor which only benefits partially from the present invention.

A liquid injector 30 is positioned at the inlet to the compressor 22 so as to regulate, atomize and spray a fine mist of water directly onto the rotor(s) 24. The injector 30 is preferably a pulse-width type injector wherein the frequency and duration of the pulses is varied to vary the amount of water sprayed onto the rotor(s) in a given period of time (e.g. grams/sec). The water for the injector 30 is pumped from the reservoir 20 by pump 40 via water supply conduit 42. The water from reservoir 20 may also be pumped via conduit 44 to other equipment in the system, (e.g. steam reformer) where it might be needed.

The amount of water sprayed onto the rotor(s) 24 is controlled to provide only so much water as is needed to optimize the energy efficiency of the compressor 22 for the amount of air passing therethrough. In the case of both the "dynamic" and "positive-displacement" compressors, the water spray cools and densifies the air in the compressor 22 which results in improved compressor efficiency. It also humidifies the air. Humidification is desirable in PEM-type fuel cells to prevent drying of the membrane electrolyte. The cooling and humidification that is achieved by evaporation of the water spray into the cathode air permits reducing the size of any humidifier and cooler that might be required downstream of the compressor to cool and humidify the air before it enters the fuel cell. In positive-displacement compressors, the water spray additionally improves compressor energy efficiency by providing a liquid seal in the narrow clearance regions between the rotors, or the rotor and a stator, which reduces internal leakage of the air in the compressor, especially at slow compressor speeds. In the case of a positive-displacement compressor, too little water does not result in optimum efficiency because it evaporates so quickly that the desired liquid seal is not obtained. Too much water, on the other hand, is troublesome because it can be transported all the way through the compressor without being completely vaporized as well as cause hydraulic pressures to buildup which can cause slugging flow within the compressor.

In accordance with the present invention, the amount of water sprayed onto the rotors is controlled and varied as a function of the mass flow rate of air entering the compressor 22 in order to achieve optimum compressor energy efficiency (i.e. lowest energy consumption for a particular mass air flow). To this end, the mass air flow rate of the input air 26 entering the compressor 22 is measured by a suitable mass air flow meter 31, and a signal 32 indicative of that flow rate is sent to a controller (i.e. Electronic Control Module) 34. A preferred mass air flow meter for this purpose is a "hot wire" or "hot film" type anemometer such as is commonly used in the intake manifolds of internal combustion engines to measure air flow to the engine, and from which the amount of fuel needed for the engine is calculated.

The controller 34 contains a lookup table which correlates water injection rates (e.g. grams/sec) to the mass flow rate of the air (e.g. grams/sec) inputted to the compressor 22 so as to minimize compressor powerdraw. The air/water flow rate values for the lookup table are determined empirically in the laboratory through a series of experiments wherein (1) a dry compressor is run at various speeds, (2) the mass flow rate of the input air to the compressor measured at each of the various speeds, (3) water injected onto the rotor(s) at different rates for each mass flow rate, and (4) the power to the input shaft to the compressor 22 measured at each condition until the minimum input power for each mass flow rate is found.

Figure 2:
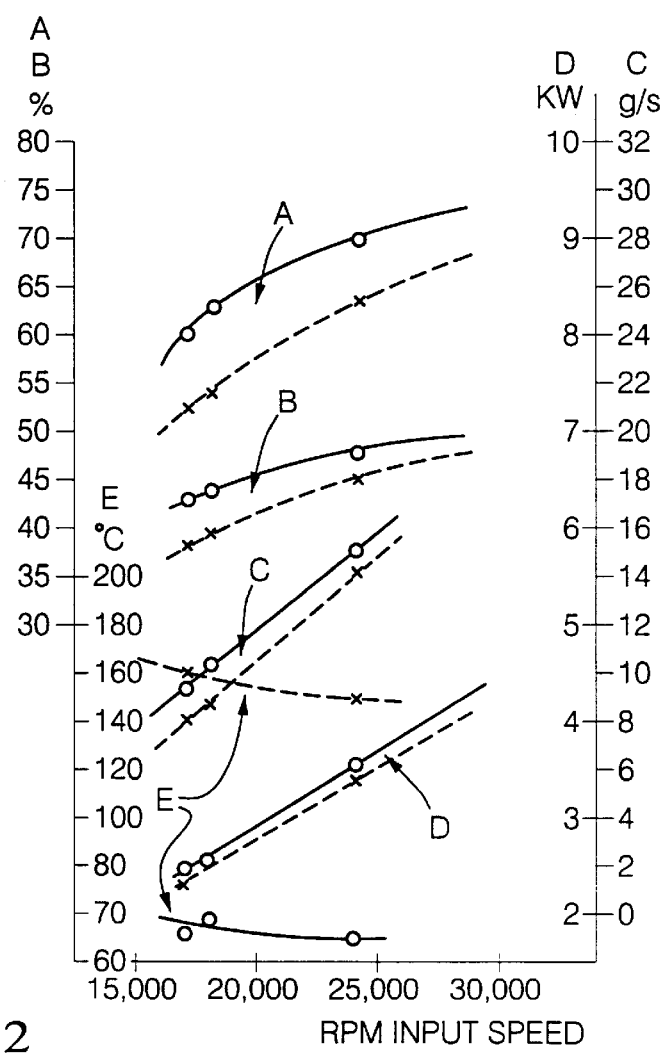
FIG. 2 is a plot of the performance of a dry, twin-screw, positive-displacement compressor run with and without water injection at various rotor speeds.

FIG. 2 shows plots for one set of empirically obtained test data useful in preparing the air-rate/water-rate lookup table on the controller 34, and shows other data useful to the fuel cell system designer. This particular set of data shows the performance obtainable with both dry operation, and with controlled water injection, into a twin-screw positive-displacement compressor operating at 20%–60% of its maximum capacity. The compressor was operated at various speeds and the water turned on and off during the test to obtain the data. FIG. 2 plots (1) volumetric efficiency [curve A] of the compressor, (2) the ratio of theoretical to actual work (i.e. adiabatic efficiency) [curve B], (3) input air mass flow rate [curve C], (4) power consumed by the compressor [curve D], and (5) the temperature of the air discharged from the compressor [curve E]. The dashed-line curves reflect the values for the compressor running dry, while the solid-line curves reflect the values for the compressor with water injection. When "on", the water was injected at a flow rate of 0.79 grams per second, and (1) lowered the compressor discharge air temperature from 150° C. to 65° C. (see curves E), (2) increased the adiabatic efficiency by as much as 5 percentage points (see curves B), (3) increased the volumetric efficiency by as much as 8 percentage points (see curves A), and (4) increased mass air flow by as much as 17.5% as compared to dry compressor (see curves C). The power consumed (curve D) by the compressor rose slightly, since a greater airflow was realized, but for an equivalent airflow the power consumed is reduced due to the improved adiabatic efficiency (curve B).

A preferred embodiment of the invention includes a purging line 45 controlled by a purge valve 46 for purging the water line 42, the line 44 to other requirement and the injector 30, with compressor output air when the system is shut down. The purge valve 46 may be operated manually, but will preferably be operated automatically in response to a signal 48 issued from the controller 34 when the system is in a shutdown mode.

The compressor 22 has essentially three operating modes i.e. (1) "dry" during system warm up, (2) "wet" during normal system operations, and (3) "purge-dry" during system shutdown. At system startup, it is necessary to raise the temperature of the fuel cell 2 to a suitable elevated temperature. This can conveniently be done, in part, by operating the compressor dry to utilize the heat of compression imparted to the air to raise the temperature of the fuel cell 2 as it passes therethrough. After the system has warmed up, water injection begins for the normal operation of the system. The amount of water injected onto the rotor(s) of the compressor is such as to maximize compressor energy efficiency across the operating air flow range of the fuel cell system. In response to inputs from the mass air flow meter 31, the system controller 34 outputs a duty-cycle to the water injector 30 to deliver the desired amount of water needed to optimize the energy efficiency of the compressor. During shutdown, the compressor operates "dry" to utilize the heat of compression imparted to the compressor output gas to evaporate any residual moisture in the injector 30, compressor 22 or water supply line 42 via purge line 45. Purging is preferably automatically controlled by the controller 34 which opens the purge valve 46 when the system is shutdown, and keeps it open for a predetermined time interval following opening of the purge valve 46.

The controller 34 may either be a controller that is dedicated strictly to the water injection technique of the present invention, or, preferably, will be part of a central controller that is used to control the many aspects of the entire fuel cell system. A central controller 34 contains the necessary hardware and software for receiving inputs, converting inputs to other values correlated to inputs, summing inputs, generating internal signals based on those inputs, conditioning (i.e. integrating/differentiating) the internal signals to provide smooth output signals, and whatever other functions might be needed to control the fuel cell system. The controller 34 may take the form of a conventional general purpose digital, computer-based controller programmed to periodically carry out the described process at predetermined intervals (e.g. every 100 milliseconds). The controller 34 includes such well known elements as (1) a central processing unit (CPU) with appropriate arithmetic and logic circuitry for carrying out arithmetic, logic, and control functions, (2) read-only memory (ROM), (3) read-write random access memory (RAM), (4) electronically programmable read only memory (EPROM), and (5) input and output circuitry which interfaces with the mass air flow meter, the water injector and the purge valve, inter alia. The ROM contains the instructions read and executed by the CPU to implement the several processes carried out by the controller including the water injection technique of the present invention. The EPROM contains appropriate lookup tables, and any needed calibration constants, for converting and comparing appropriate inputs/outputs. The controller 34 processes the signal 32 to provide appropriate control signals 33 for the injector 30, as well as shut down signals emanating elsewhere in the system indicative of system shutdown to provide signal 48 to the water purge valve 36.

While the invention has been disclosed in terms of a specific embodiment thereof, it is not intended to be limited thereto, but rather only to the extent set forth hereafter in the claims which follow.

What is claimed is:

1. A fuel cell system comprising: (1) a fuel cell having a cathode inlet admitting compressed air into said fuel cell and a cathode outlet for exhausting cathode effluent from said fuel cell, said effluent containing water generated within said fuel cell; (2) a collector downstream of said cathode outlet for collecting said water from said effluent; (3) a pump for removing said water from said collector; (4) an electric-motor-driven dry compressor energized by said fuel cell for compressing input air and supplying it as compressed air to said cathode inlet via a first conduit over a range of operating pressures suitable to said field cell, said compressor having at least one rotor; (5) an injector communicating with said compressor to spray a mist of said water from said collector directly onto said rotor; (6) a second conduit communicating said pump with said injector to supply said injector with said water; (7) a mass flow meter for measuring the mass flow rate of said input air into said compressor; and (8) a controller communicating with said mass flow meter and said injector to modulate the flow of water through said injector as a function of the mass flow rate of said input air into said compressor to optimize the energy efficiency of said compressor over said compressor's range of operation and thereby reduce the parasitic electrical load on said fuel cell.

2. A fuel cell system comprising: (1) a fuel cell having a cathode inlet admitting compressed air into said fuel cell and a cathode outlet for exhausting cathode effluent from said fuel cell, said effluent containing water generated within said fuel cell; (2) a collector downstream of said cathode outlet for collecting said water from said effluent; (3) a pump for removing said water from said collector; (4) an electric-motor-driven dry compressor energized by said fuel cell for compressing input air and supplying it as compressed air to said cathode inlet via a first conduit over a range of operating pressures suitable to said fuel cell, said compressor having at least one rotor; (5) an injector communicating with said compressor to spray a mist of said water from said collector directly onto said rotor; (6) a second conduit communicating said pump with said injector to supply said injector with said water; (7) a mass flow meter for measuring the mass flow rate of said input air into said compressor; (8) a controller communicating with said mass flow meter and said injector to modulate the flow of water through said injector as a function of the mass flow rate of said input air into said compressor to optimize the energy efficiency of said compressor over said compressor's range of operation and thereby reduce the parasitic electrical load on said fuel cell; (9) a third conduit communicating said first and second conduits for purging water from said second conduit and said injector with said compressor output air during shutdown of said fuel cell; and (10) a valve operatively associated with said third conduit to control the flow of said compressed air in said third conduit.

3. The fuel cell system according to claim 2 wherein said controller communicates with said valve to control said valve.

4. The fuel cell system according to claim 1 wherein said injector comprises a pulse width modulated injector.

5. A method of operating a fuel cell system comprising the steps of:
   a. inputting air to an electric-motor-driven dry compressor that is energized by said fuel cell and provides compressed air to the cathode of said fuel cell at operating pressures suitable to said fuel cell, said compressor having at least one rotor for effecting said compressing;
   b. exhausting effluent from said cathode, said effluent containing water generated in said fuel cell;
   c. collecting said water from said effluent in a collector downstream of said fuel cell;
   d. spraying said water from said collector onto said rotor so as to increase the efficiency of said compressor over a range of compressor operating speeds;
   e. measuring the mass flow rate of said air inputted to said compressor; and
   f. modulating the amount of said spray in relation to said mass flow rate to minimize the energy consumed by said compressor over said range and thereby reduce the parasitic electrical load on said fuel cell.

6. A method according to claim 5 wherein said water is collected from said effluent immediately after exiting said fuel cell.

7. A method according to claim 5 wherein said system includes a fuel processor and a combustor fueled by said effluent for heating said fuel processor, and said water is collected from said effluent downstream from said combustor.

8. A method of operating a fuel cell system comprising the steps of:
   a. inputting air to an electric-motor-driven dry compressor that is energized by said fuel cell provides compressed air to the cathode of said fuel cell at operating pressures suitable to said fuel cell, said compressor having at least one rotor for effecting said compressing;
   b. running said dry compressor dry during warm-up of said system to accelerate said warm-up with the heat of compression of said air;
   c. exhausting effluent from said cathode, said effluent containing water generated in said fuel cell;
   d. collecting said water from said effluent in a collector downstream of said fuel cell;
   e. after said system has warmed-up to about its normal operating temperature, spraying said water from said collector onto said rotor so as to increase the efficiency of said compressor over a range of compressor operating speeds;
   f. measuring the mass flow rate of said air inputted to said compressor; and
   g. modulating the amount of said spray in relation to said mass flow rate to minimize the energy consumed by said compressor over said range and thereby reduce the parasitic electrical load on said fuel cell.

9. A method of operating a fuel cell system comprising the steps of:
   a. inputting air to an electric-motor-driven dry compressor that is energized by said fuel cell and provides compressed air to the cathode of said fuel cell at operating pressures suitable to said fuel cell, said compressor having at least one rotor for effecting said compressing;
   b. exhausting effluent from said cathode, said effluent containing water generated in said fuel cell;

c. collecting said water from said effluent in a collector downstream of said fuel cell;
d. spraying said water from said collector onto said rotor so as to increase the efficiency of said compressor over a range of compressor operating speeds;
e. measuring the mass flow rate of said air inputted to said compressor;
f. modulating the amount of said spray in relation to said mass flow rate to minimize the energy consumed by said compressor over said range and thereby reduce the parasitic electrical load on said fuel cell; and
g. during shutdown of said system, ceasing said spraying, and running said compressor dry to utilize the increased heat of compression of said air to evaporate any residual water in said system.

* * * * *